US010728201B2

(12) United States Patent
Ratiu et al.

(10) Patent No.: US 10,728,201 B2
(45) Date of Patent: Jul. 28, 2020

(54) BATCHING OF NOTIFICATIONS

(71) Applicant: Facebook, Inc., Menlo Park, CA (US)

(72) Inventors: Florin Ratiu, Mountain View, CA (US); Andrew Alexander Birchall, San Francisco, CA (US); David S. Park, Los Altos, CA (US); Aleksandar Ilic, Los Altos, CA (US); Nathan Paul Schloss, San Francisco, CA (US); Vasanth Kumar Rajendran, Palo Alto, CA (US); Yiyu Li, Mountain View, CA (US); Patrick Jonathan Varin, San Francisco, CA (US); Branislav Stojkovic, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 929 days.

(21) Appl. No.: 14/923,332

(22) Filed: Oct. 26, 2015

(65) Prior Publication Data

US 2017/0118159 A1    Apr. 27, 2017

(51) Int. Cl.
*H04L 12/58* (2006.01)
*H04L 29/08* (2006.01)

(52) U.S. Cl.
CPC ............ *H04L 51/26* (2013.01); *H04L 67/306* (2013.01)

(58) Field of Classification Search
CPC .............................. H04L 51/26; H04L 67/306
See application file for complete search history.

(56) References Cited

U.S. PATENT DOCUMENTS

| | | | | |
|---|---|---|---|---|
| 5,841,600 A * | 11/1998 | Kaplan | ............... | G11B 20/1866 360/48 |
| 8,095,432 B1 * | 1/2012 | Berman | ............. | G06Q 30/0631 705/26.7 |
| 9,118,614 B1 * | 8/2015 | Rogers | .................... | H04L 51/36 |
| 2008/0288589 A1 * | 11/2008 | Ala-Pietila | ........... | G06Q 10/109 709/204 |
| 2010/0293235 A1 * | 11/2010 | Cadoret | ................... | G06F 9/546 709/206 |
| 2013/0013702 A1 * | 1/2013 | Ebisawa | ............. | G06F 11/0703 709/206 |
| 2013/0018964 A1 * | 1/2013 | Osipkov | ............... | H04L 67/306 709/206 |
| 2013/0226943 A1 * | 8/2013 | Zheng | ..................... | H04L 51/04 707/755 |
| 2013/0290879 A1 * | 10/2013 | Greisson | ........... | H04M 1/72522 715/764 |
| 2014/0129661 A1 * | 5/2014 | Thyagaraja | ............. | G06F 9/542 709/207 |

(Continued)

*Primary Examiner* — Tonia L Dollinger
*Assistant Examiner* — Jihad K Boustany
(74) *Attorney, Agent, or Firm* — BakerHostetler LLP

(57) ABSTRACT

In one embodiment, a method includes receiving a number of notifications of one or more activities relevant to a user. Each notification has an associated receipt time and type of notification. The method also includes aggregating one or more of the notifications based on the type of notification; determining a sending time to send the aggregated notifications based at least in part on determining that a predetermined amount of time that has elapsed from a receipt time of a most recent one of the aggregated notifications; and sending the aggregated notifications to the user based on the sending time.

18 Claims, 10 Drawing Sheets

(56) References Cited

U.S. PATENT DOCUMENTS

| | | | |
|---|---|---|---|
| 2014/0207883 A1* | 7/2014 | Castellucci | H04L 51/04 709/206 |
| 2014/0289384 A1* | 9/2014 | Kao | H04L 51/12 709/223 |
| 2015/0057766 A1* | 2/2015 | Ejiri | G05B 15/02 700/14 |

* cited by examiner

BATCHING OF NOTIFICATIONS

TECHNICAL FIELD

This disclosure generally relates to delivering notifications.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send content or messages related to its services one or more networks to a mobile or other computing device of a user over. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, a notification-providing system may deliver notifications to a user in a user-aware manner. Such notifications may be sent through one or more delivery channels, e.g., sent by one or more communication media (e.g., SMS, MMS, e-mail, particular application, voice) to one or more unique endpoints (e.g., a telephone number, an e-mail address, a particular client device as specified by a unique device identifier, a particular user account for the particular application or for the client device).

In particular embodiments, notifications of a common type (e.g., posts) may be batched in a time-based queue prior to being sent to the user. For example, the batch of notifications may be sent at a pre-determined time period after the notification of the most recent activity was placed in the queue, such that the notifications are sent to the user in a temporally relevant manner. There may be a delay in sending the batch of notifications based on receiving a notification of new activity that would cause an "aggregation" within a pre-determined time period of last activity ("invalidation"). A digest or summary notification may be sent in lieu of the batch of notifications. In particular embodiments, the send time for the batch of notifications may be modified by click-through rate (CTR) (e.g., when the predicted CTR for the batch of notifications is above a pre-determined threshold). Also, particular notifications may be excluded from batching (e.g., notifications from a "verified" profile or close friends). In this case, the user may get separate notifications for these cases.

In particular embodiments, notification engagement at a given time may be increased by selecting notifications with content of interest to the user in contrast to event-triggered sending of notifications. In particular embodiments, a notification-providing system may analyze and rank the notifications that are available to be sent to a user. The ranking of the notifications may be based on the type of notification (e.g., friend post, people you may know (PYMK), trending topic, etc.), one or more features of each type of notification, user history of the particular type notifications (e.g., previous engagement or CTR), or any combination of these. For example, posts may be ranked by number of likes of the post or affinity between users. As another example, PYMK may be ranked by PYMK scores. In particular embodiments, notifications may be selected based on the ranking of each notification being above a pre-determined threshold value.

In particular embodiments, notifications or delivery channels may be classified to infer the importance of the particular type of notifications to each user ("implicit subscription"). In particular embodiments, the inferred importance may determine a sub-set of notifications were not explicitly requested (e.g., comments on the user's posts, posts referencing the user, etc.) that are sent to the user. Each type of notification may be classified and each type given an associated inferred subscription level. In particular embodiments, notifications of a particular type may be sent to the user based on the inferred subscription level associated with each type of notification. In particular embodiments, the subscription level inferred for each user may be based on user history, affinity, etc.

In particular embodiments, the notification-providing system may estimate the CTR for a particular type of notification. The notification-providing system may determine push thresholds for each user that determine whether a particular type of notification is sent. For example, the push thresholds may be determined based on predicting conversion rates (e.g., CTR) from past user history. Push thresholds may be calculated at pre-determined periods of time (e.g., every day) based on the previous week's conversion history. In addition, push thresholds may be inferred based on negative signals (e.g., zero CTR (never clicking), unsubscribe (by type, by content item, indication of "don't like", or context/group-related), disabling push notifications, app logout, or any combination of these).

In particular embodiments, the content of a notification may be modified/stripped based on CTR, type of notification, content, or cost of data. For example, the content particular types of notifications may be modified to include one or more calls to action (CTA), such as for example a link. For a given medium/channel, the notification-providing system may infer the user engagement with particular CTA on different types of notifications. For example, the notification-providing system may track whether a user tends to click on a link of a notification to get to a website. As another example, the notification-providing system may track whether the user uses a reply functionality of a notification. In particular embodiments, the inferred engagement with a CTA may depend on the channel used to deliver the notification. For example, users may click links more often in e-mail than SMS based on user history. In particular embodiments, the notification-providing system may determine user engagement with a particular CTA by attributing a subsequent action to a received notification.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category (e.g., method) can be claimed in another claim category (e.g., system) as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1A:
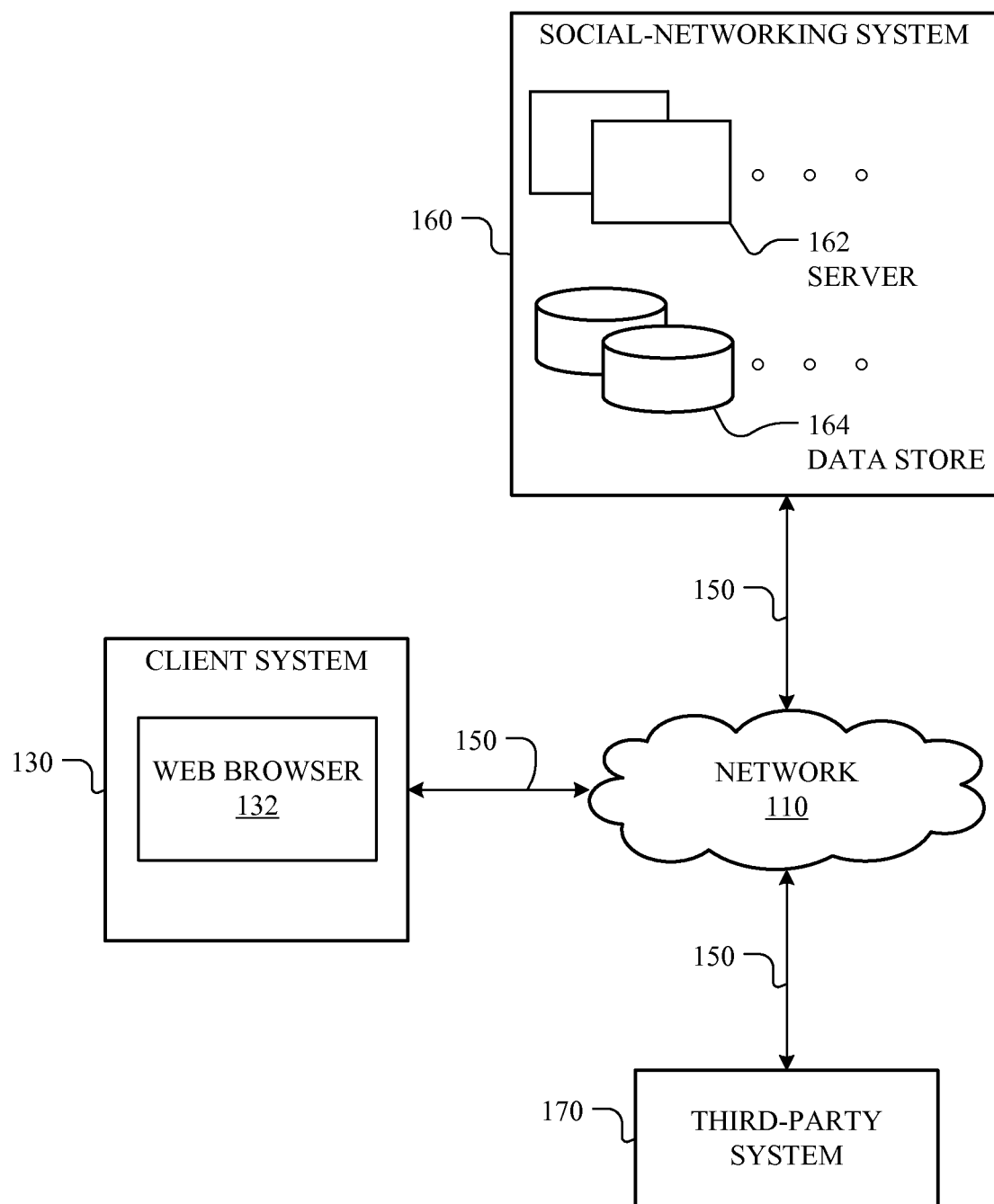
FIG. 1A illustrates an example network environment associated with a social-networking system.

In particular embodiments, a notification-providing system may deliver notifications to a user in a user-aware manner. Such notifications may be sent through one or more delivery channels, e.g., sent by one or more communication media (e.g., short-messaging service (SMS), multimedia-messaging service (MMS), electronic mail (e-mail), particular application, voice) to one or more unique endpoints (e.g., a telephone number, an e-mail address, a particular client device as specified by a unique device identifier, a particular user account for the particular application or for the client device). In particular embodiments, the notification-providing system may utilize different techniques to attempt to provide a notification to a user in a manner that increases the likelihood that the user will interact with the notification (e.g., a "click-through" action whereby the user clicks on a link presented in a visual notification presenting socially-relevant or promotional content), which hopefully increases the likelihood that a "conversion" takes place—that the user takes some final action that is the ultimate goal of delivering the notification (e.g., completes an action, such as a registration, content consumption, or a purchase, on a social-networking or third-party website).

In particular embodiments, the notification-providing system may be implemented as part of a social-networking system that may handle requests to deliver notifications to a user of the social-networking system in a user-aware manner. The social-networking system may register one or more delivery channels for delivery of notifications to the user. Upon receiving one or more requests from a third-party or the social-networking system to send notifications to the user, the social-networking system may assess the user's current delivery context with respect to the registered delivery channels and determine a delivery policy to be applied to the request(s). The social-networking system may then handle the requests in accordance with the delivery policy, which may include sending at least one notification to the user to fulfill the requests.

In particular embodiments, a policy engine of the notification-providing system may assess different factors in order to determine the delivery policy (e.g., the delivery instructions) for a notification. For any particular notification, the policy engine may assess not only (1) information associated with the notification (e.g., the source, content, type, time stamp, or format) and (2) information associated with a particular user (e.g., demographic information for the user, the user's location, the user's available delivery channels and the status thereof, the user's current delivery context, user profile information, or social-networking information for the user), but also (3) historical notification information about this particular user's responses to past notifications (e.g., conversion rates or click-through rates CTR) for different notification/context/type/content/delivery patterns) and about prior context/delivery patterns (if any) for the current notification (and interaction levels, if any, for those prior context/delivery patterns). As described below, the policy engine may determine a delivery policy for a notification or type of notification based on an inferred importance of the notification to the user. Furthermore, the policy engine may determine a delivery policy for a notification or type of notification based on identifying notifications or type of notifications of interest to the user.

In particular embodiments, a history service of the notification-providing system may collect and analyze the user's responses to past notifications in order to determine the user's level of interaction (if any) with the past notifications. Information about the user's responses to past notifications may be stored in a historical notification data store. The type of historical data collected about a past notification may include, by way of example and not limitation: the notification content and format, the source of the notification, the date and time when the past notification was delivered to the user, the delivery channel(s) to which the notification was sent, whether the notification was successfully delivered to the delivery channel(s) (and attempted context/delivery patterns), CTR of the type of notification or content components of the notification, or information about subsequent activity associated with the notification (e.g., a completed transaction (wherein the completed transaction is associated with the past notification), including time-to-completion).

Using such historical data, the history service may also rank, by their conversion rates or CTR, different aspects of the notification/context/delivery patterns for past notifications sent to a particular user, such as, by way of example and not limitation: delivery channels, notification content types, notification sources, delivery contexts, or delivery patterns. In particular embodiments, the history service may compute the ranking of conversion rates or CTR by combining together two sets of data, for example, the average conversion rate for a particular delivery channel at a first time after delivery of the notification (e.g., 3 hours after delivery) and the average conversion score for a particular delivery channel at a second time after delivery of the notification (e.g., 36 hours after delivery). Taking a global view of such historical data, the history service may also rank, by their conversion scores or CTR, different aspects of the notification/context/delivery patterns for past notifications across all users.

As information about user interactions with notifications sent to the user are sent back to the notification-providing system, the history service may continually update the historical notification data based on received information, so as to provide the policy engine with the most up-to-date information about past user interactions. In some embodiments, the history service may also maintain a decision-tree model, based on the historical notification data, for determining delivery instructions for a current notification. The decision-tree model itself may be initially constructed using a machine-learning algorithm, based on a set of training data and/or a pre-existing set of historical data.

In particular embodiments, a registration service of the notification-providing system may collect and store information sent by a device of the user upon enabling a new delivery channel (a communication medium-endpoint combination). For example, if the user installs a software application on their computing device through which notifications may be delivered, the application may send registration information back to the registration service indicating that a new delivery channel is now available for this particular user—that a new communication medium (e.g., a particular application) is available for a particular endpoint (e.g., the computing device). Such registration information may be provided in the form of a registration token identifying the user, the installed instance, and the computing device. The registration information about the user's available delivery channels may then be provided to the policy engine for use when determining the delivery policy to be applied to a particular notification. Information about the user's available delivery channels may be stored in a registration data store. The registration data may include, by way of example and not limitation: a unique identifier for the endpoint, features and capabilities of the endpoint (e.g., audio-visual specifications, battery capacity, or network connectivity specifications), a unique identifier for the communication medium, features and capabilities of the communication medium (e.g., maximum message size, data transfer allotment, cost of data, or maximum bandwidth), or a unique identifier for the installed instance of the software application.

By assessing information such as that described above, the policy engine may generate a delivery policy for the notification. The delivery policy may provide instructions for a notification delivery service to deliver the notification in accordance with a specified context/delivery pattern. The context/delivery pattern may provide instructions regarding when to send the notification (e.g., day, time, ideal delivery context), how to send the notification (e.g., which delivery channels should be utilized), a maximum duration beyond which the notification should be re-delivered, when and how to re-deliver the notification in the absence of user interaction and/or successful conversion, or whether to deliver the notification in light of (1) the information associated with the notification, (2) the information associated with a particular user, and (3) the historical notification information.

Actual delivery of the notification may be handled by a notification-delivery service, which receives the notification and the delivery policy. The notification-delivery service may generate an appropriate form of the notification for delivery through the selected delivery channel(s). As described below, the notification delivery service may modify the content of a notification based on information from the history service, type of notification, content of the notification, cost of data associated with each delivery channel, or any combination thereof.

The notification delivery service may schedule the notification for delivery at a specified time and day, for delivery upon detecting a particular user delivery context (e.g., upon detecting that the user has begun actively using their mobile device; upon determining, based on the user's calendar information, that the user should be available; or upon determining that the user's location has changed); or upon determining upon determining a threshold criteria of the notification has been reached (e.g., upon determining the amount of time that has elapsed since most recent activity; or upon determining a particular CTR threshold for the type of notification has been satisfied).

Information about user interactions with the notification may be sent back to a response-handling service by way of the same delivery channel by which the related notification was delivered. Such information may include, for example, and without limitation: whether the user ever actively opened the notification (including, e.g., how many times the user actively opened the notification), user attention level with respect to the opened notification (including, e.g., how many times the user viewed or listened to the notification, how long the user paid attention on each occasion, and the user's delivery context on each occasion), whether the user clicked on a link in the notification, or whether the user provided feedback regarding the notification (e.g., clicking to "Like" or rate the notification, or commenting on the notification). Such information may also factor in negative signals, such as, for example, and without limitation: whether the user dismissed the notification without opening it, whether the user subsequently blocked notifications from the source of the notification, whether the user subsequently disabled push notifications, whether the user subsequently logged out of the application, or whether the user subsequently unsubscribed from receiving certain e-mail notifications.

Other factors may be considered when computing a conversion rate, such as: comparison with an expected level of interaction, comparison with an average level of interaction, the duration of time between delivery of the notification and the user interaction with the notification, delivery patterns leading to the interaction, or the number and/or pattern of lower-level interactions leading up to a higher-level interaction). A conversion rate may be determined based on a target user interaction (e.g., in some cases, the ultimate goal of a notification may be to cause the user to open and view the full text of the notification, whereas, in other cases, the ultimate goal of a notification may be to motivate the user to interact with a call-to-action (CTA). A CTA of a notification may be represented as a link or icon displayed in close proximity to or within the content of the notification and corresponds to a specific action the user may perform in connection with notification (e.g., click on a link in the notification). Example actions associated with a CTA may correspond to a particular functionality of the social-networking system (e.g., liking a post, sharing a post, or replying to a comment of a post), a third-party system (e.g., make a reservation or purchase items through a third-party website), or a client device (e.g., call a friend or launch a game application). Another example call-to-action may be associated with a Uniform Resource Locator (URL) (e.g., a web page a server-side script of the social-networking or third-party system). After clicking on a link of a notification (e.g., an advertisement), the user may then complete a purchase, download, or registration on a third-party website. The response-handling service may then forward user interaction information to the history service, which may collect and analyze the user's responses to past notifications, as described above.

FIG. 1A illustrates an example network environment 100 associated with a social-networking system. Network environment 100 includes a client system 130, a social-networking system 160, and a third-party system 170 connected to each other by a network 110. Although FIG. 1A illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1A illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. As an example and not by way of limitation, client system 130 may access social-networking system 160 using a web browser 132, or a native application associated with social-networking system 160 (e.g., a mobile social-networking application, a messaging application, another suitable application, or any combination thereof) either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 to whom they want to be connected. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Figure 1B:
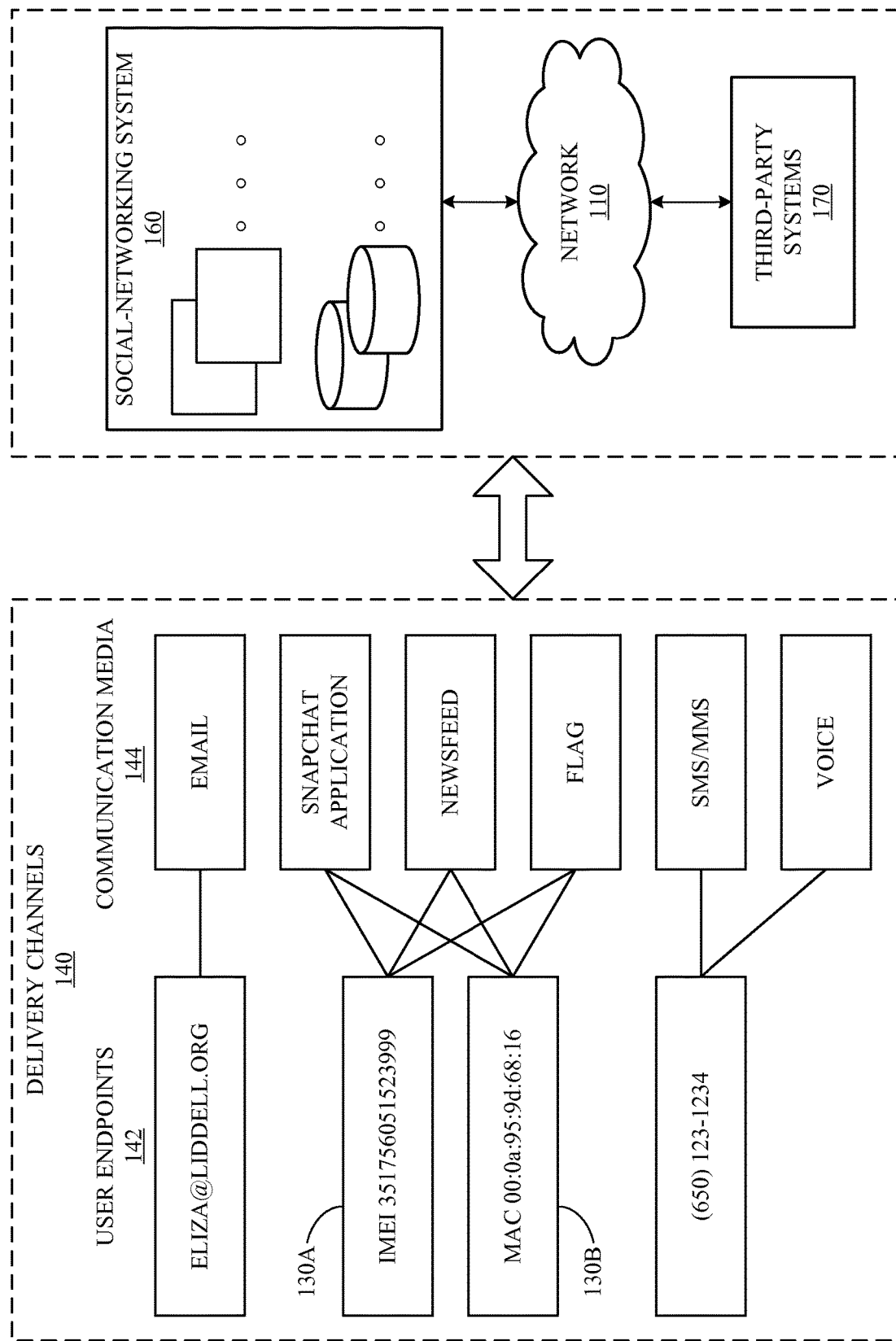
FIG. 1B illustrates an example architecture for delivering notifications to a user.

FIG. 1B illustrates an example architecture for delivering notifications to a user (e.g., Eliza Liddell). In one example embodiment described herein, elements of the notification-providing system may be implemented as part of social-networking system 160, and the notification-providing system may handle delivery of notifications generated by third-party systems 170 as well as by social-networking system 160 itself. In particular embodiments, elements of the notification-providing system may be implemented as part of third-party system 170.

As shown in FIG. 1B, notifications may be delivered by way of a number of different delivery channels 140. As discussed above, a delivery channel 140 may comprise one or more uniquely-identified endpoints 142 and one or more communication media 144. As shown in FIG. 1B, notifications may be delivered by one or more communication media (e.g., SMS, MMS, e-mail, particular application, voice, newsfeed, flag) to one or more unique endpoints (e.g., a telephone number, an e-mail address, a particular client device as specified by a unique device identifier, a particular user account for the particular application or for the client device). In some embodiments, a particular communication medium may be able to deliver a notification to more than one endpoint—for example, a third-party application such as SNAPCHAT (communication media) may be installed on the user's smartphone client device 130A (first endpoint) and also on the user's laptop 130B (second endpoint). Communication media may be a push-type medium, such as SMS or e-mail, or it may be a pull-type medium, such as a newsfeed.

In particular embodiments, the notification-providing system may select different delivery channels for notifications based on the user's available delivery channels and the status thereof. As discussed above, the information about the user's available delivery channels may be retrieved from the registration data store (e.g., information to enable the notification-providing system to deliver the notification to a SNAPCHAT application). The notification-providing system may also select different delivery channels or endpoint options for notifications based on the user's current delivery context, which may include device status. For example, if Eliza just checked in at a movie theater with her friends, then delivery of any notifications may be delayed or the notification dimension of an endpoint may be configured to deliver notifications to her smartphone in "Silent" or "Vibrate" mode until movement detected by the phone indicates that she is exiting the theater. The notification-providing system may also choose to "escalate" a notification from a lower-ranked delivery channel (e.g., newsfeed) to a higher-ranked delivery channel (e.g., SMS) when delivering a particular type of notification or notifications with particular content based on an inferred interest, in order to increase the likelihood that the receiving user will interact with the notification. As another example, the notification-providing system may choose a particular delivery channel based on satisfying a pre-determined criteria of the notification (e.g., satisfying a target CTR threshold).

Figure 2:
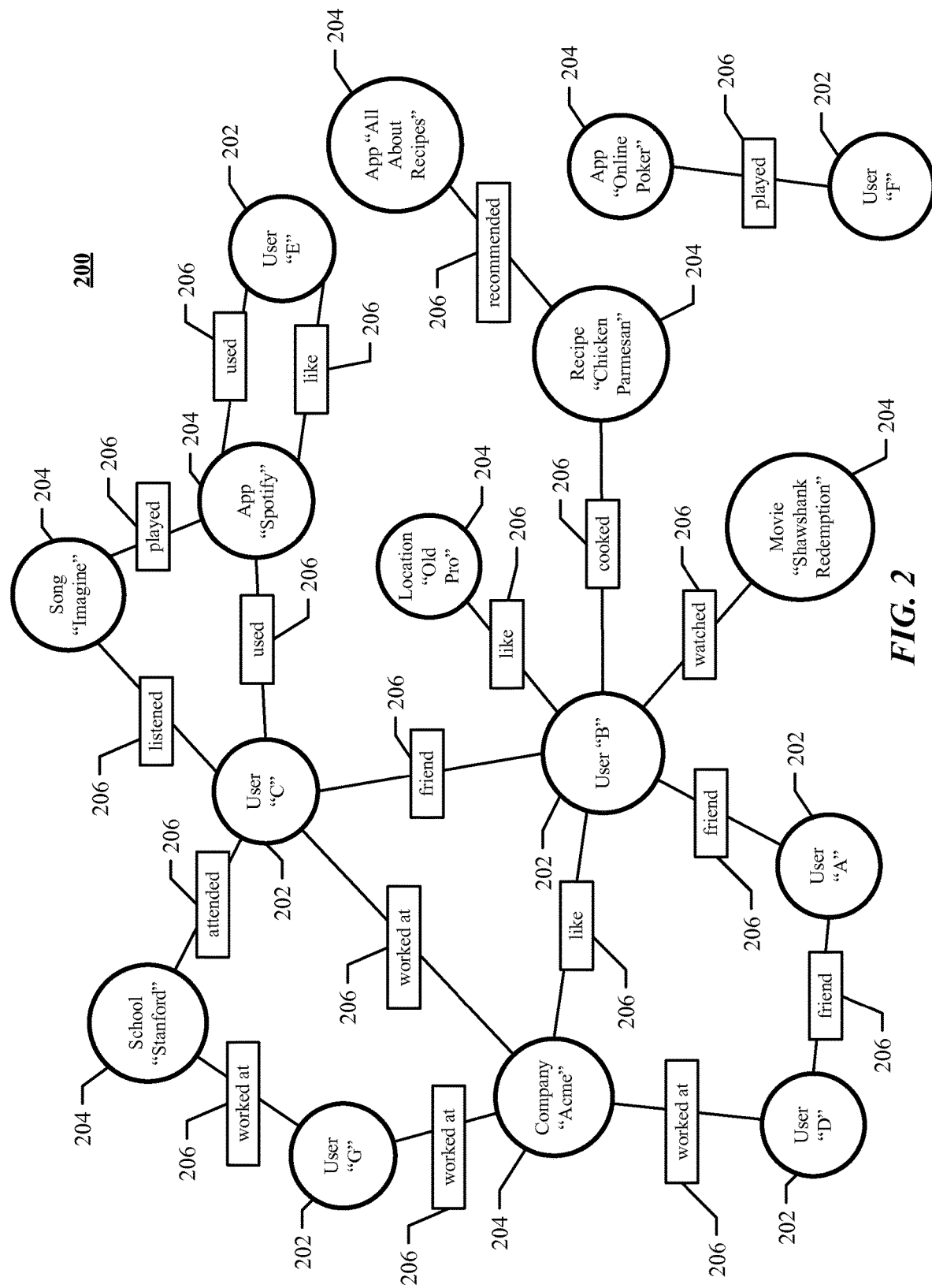
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an e-mail address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played,"

"listened," "cooked," "worked at," or "watched" a concept, each of which may correspond to an edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more web pages, in one or more e-mails, or in connection with search results requested by a user. In addition or as an alternative, an advertisement may be one or more sponsored stories (e.g., a news-feed or ticker item on social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. The social action may be promoted within or on social-networking system 160. In addition or as an alternative, the social action may be promoted outside or off of social-networking system 160, where appropriate. In particular embodiments, a page may be an on-line presence (such as a webpage or website within or outside of social-networking system 160) of a business, organization, or brand facilitating its sharing of stories and connecting with people. A page may be customized, for example, by adding applications, posting stories, or hosting events.

A sponsored story may be generated from stories in users' news feeds and promoted to specific areas within displays of users' web browsers when viewing a web page associated with social-networking system 160. Sponsored stories are more likely to be viewed by users, at least in part because sponsored stories generally involve interactions or suggestions by the users' friends, fan pages, or other connections. In connection with sponsored stories, particular embodiments may utilize one or more systems, components, elements, functions, methods, operations, or steps disclosed in U.S. patent application Ser. No. 13/327,557, entitled "Sponsored Stories Unit Creation from Organic Activity Stream" and filed 15 Dec. 2011, U.S. Patent Application Publication No. 2012/0203831, entitled "Sponsored Stories Unit Creation from Organic Activity Stream" and filed 3 Feb. 2012 as U.S. patent application Ser. No. 13/020,745, or U.S. Patent Application Publication No. 2012/0233009, entitled "Endorsement Subscriptions for Sponsored Stories" and filed 9 Mar. 2011 as U.S. patent application Ser. No. 13/044,506, which are all incorporated herein by reference as an example and not by way of limitation. In particular embodiments, sponsored stories may utilize computer-vision algorithms to detect products in uploaded images or photos lacking an explicit connection to an advertiser as disclosed in U.S. patent application Ser. No. 13/212,356, entitled "Computer-Vision Content Detection for Sponsored Stories" and filed 18 Aug. 2011, which is incorporated herein by reference as an example and not by way of limitation.

As described above, an advertisement may be text (which may be HTML-linked), one or more images (which may be HTML-linked), one or more videos, audio, one or more ADOBE FLASH files, a suitable combination of these, or any other suitable advertisement in any suitable digital format. In particular embodiments, an advertisement may be requested for display within third-party webpages, socialnetworking-system webpages, or other pages. An advertisement may be displayed in a dedicated portion of a page, such as in a banner area at the top of the page, in a column at the side of the page, in a GUI of the page, in a pop-up window, over the top of content of the page, or elsewhere with respect to the page. In addition or as an alternative, an advertisement may be displayed within an application or within a game. An advertisement may be displayed within dedicated pages, requiring the user to interact with or watch the advertisement before the user may access a page, utilize an application, or play a game. The user may, for example view the advertisement through a web browser.

A user may interact with an advertisement in any suitable manner. The user may click or otherwise select the advertisement, and the advertisement may direct the user (or a browser or other application being used by the user) to a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). In particular embodiments, an advertisement may include one or more games, which a user or other application may play in connection with the advertisement. An advertisement may include functionality for responding to a poll or question in the advertisement.

An advertisement may include social-networking-system functionality that a user may interact with. For example, an advertisement may enable a user to "like" or otherwise endorse the advertisement by selecting an icon or link associated with endorsement. Similarly, a user may share the advertisement with another user (e.g., through social-networking system 160) or RSVP (e.g., through social-networking system 160) to an event associated with the advertisement. In addition or as an alternative, an advertisement may include social-networking-system content directed to the user. For example, an advertisement may display information about a friend of the user within social-networking system 160 who has taken an action associated with the subject matter of the advertisement.

Social-networking-system functionality or content may be associated with an advertisement in any suitable manner. For example, an advertising system (which may include hardware, software, or both for receiving bids for advertisements and selecting advertisements in response) may retrieve social-networking functionality or content from social-networking system 160 and incorporate the retrieved social-networking functionality or content into the advertisement before serving the advertisement to a user. Examples of selecting and providing social-networking-system functionality or content with an advertisement are disclosed in U.S. Patent Application Publication No. 2012/0084160, entitled "Providing Social Endorsements with Online Advertising" and filed 5 Oct. 2010 as U.S. patent application Ser. No. 12/898,662, and in U.S. Patent Application Publication No. 2012/0232998, entitled "Selecting Social Endorsement Information for an Advertisement for Display to a Viewing User" and filed 8 Mar. 2011 as U.S. patent application Ser. No. 13/043,424, which are both incorporated herein by reference as examples only and not by way of limitation. Interacting with an advertisement that is associated with social-networking-system functionality or content may cause information about the interaction to be displayed in a profile page of the user in social-networking-system 160.

Particular embodiments may facilitate the delivery of advertisements to users that are more likely to find the advertisements more relevant or useful. For example, an advertiser may realize higher conversion rates (and therefore higher return on investment (ROI) from advertising) by identifying and targeting users that are more likely to find its advertisements more relevant or useful. The advertiser may use user-profile information in social-networking system 160 to identify those users. In addition or as an alternative, social-networking system 160 may use user-profile information in social-networking system 160 to identify those users for the advertiser. As examples and not by way of limitation, particular embodiments may target users with the following: invitations or suggestions of events; suggestions regarding coupons, deals, or wish-list items; suggestions regarding friends' life events; suggestions regarding groups; advertisements; or social advertisements. Such targeting may occur, where appropriate, on or within social-networking system 160, off or outside of social-networking system 160, or on mobile computing devices of users. When on or within social-networking system 160, such targeting may be directed to users' news feeds, search results, e-mail or other in-boxes, or notifications channels or may appear in particular area of web pages of social-networking system 160, such as a right-hand side of a web page in a concierge or grouper area (which may group along a right-hand rail advertisements associated with the same concept, node, or object) or a network-ego area (which may be based on what a user is viewing on the web page and a current news feed of the user). When off or outside of social-networking system 160, such targeting may be provided through a third-party website, e.g., involving an ad exchange or a social plug-in. When on a mobile computing device of a user, such targeting may be provided through push notifications to the mobile computing device.

Targeting criteria used to identify and target users may include explicit, stated user interests on social-networking system 160 or explicit connections of a user to a node, object, entity, brand, or page on social-networking system 160. In addition or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also include privacy settings (such as user opt-outs), data hashing, or data anonymization, as appropriate.

To target users with advertisements, particular embodiments may utilize one or more systems, components, elements, functions, methods, operations, or steps disclosed in the following, which are all incorporated herein by reference as examples and not by way of limitation: U.S. Patent Application Publication No. 2009/0119167, entitled "Social Advertisements and Other Informational Messages on a Social Networking Website and Advertising Model for Same" and filed 18 Aug. 2008 as U.S. patent application Ser. No. 12/193,702; U.S. Patent Application Publication No. 2009/0070219, entitled "Targeting Advertisements in a Social Network" and filed 20 Aug. 2008 as U.S. patent application Ser. No. 12/195,321; U.S. Patent Application Publication No. 2012/0158501, entitled "Targeting Social Advertising to Friends of Users Who Have Interacted With an Object Associated with the Advertising" and filed 15 Dec. 2010 as U.S. patent application Ser. No. 12/968,786; or U.S. Patent Application Publication No. 2012/0166532, entitled "Contextually Relevant Affinity Prediction in a Social-Networking System" and filed 23 Dec. 2010 as U.S. patent application Ser. No. 12/978,265.

An advertisement may be presented or otherwise delivered using plug-ins for web browsers or other applications, iframe elements, news feeds, tickers, notifications (which may include, for example, e-mail, Short Message Service (SMS) messages, or notifications), or other means. An advertisement may be presented or otherwise delivered to a user on a mobile or other computing device of the user. In connection with delivering advertisements, particular embodiments may utilize one or more systems, components, elements, functions, methods, operations, or steps disclosed in the following, which are all incorporated herein by reference as examples and not by way of limitation: U.S. Patent Application Publication No. 2012/0159635, entitled "Comment Plug-In for Third-Party System" and filed 15 Dec. 2010 as U.S. patent application Ser. No. 12/969,368; U.S. Patent Application Publication No. 2012/0158753, entitled "Comment Ordering System" and filed 15 Dec. 2010 as U.S. patent application Ser. No. 12/969,408; U.S. Pat. No. 7,669,123, entitled "Dynamically Providing a News Feed About a User of a Social Network" and filed 11 Aug. 2006 as U.S. patent application Ser. No. 11/503,242; U.S. Pat. No. 8,402,094, entitled "Providing a Newsfeed Based on User Affinity for Entities and Monitored Actions in a Social Network Environment" and filed 11 Aug. 2006 as U.S. patent application Ser. No. 11/503,093; U.S. Patent Application Publication No. 2012/0072428, entitled "Action Clustering for News Feeds" and filed 16 Sep. 2010 as U.S. patent application Ser. No. 12/884,010; U.S. Patent Application Publication No. 2011/0004692, entitled "Gathering Information about Connections in a Social Networking Service" and filed 1 Jul. 2009 as U.S. patent application Ser. No. 12/496,606; U.S. Patent Application Publication No. 2008/0065701, entitled "Method and System for Tracking Changes to User Content in an Online Social Network" and filed 12 Sep. 2006 as U.S. patent application Ser. No. 11/531,154; U.S. Patent Application Publication No. 2008/0065604, entitled "Feeding Updates to Landing Pages of Users of an Online Social Network from External Sources" and filed 17 Jan. 2007 as U.S. patent application Ser. No. 11/624,088; U.S. Pat. No. 8,244,848, entitled "Integrated Social-Network Environment" and filed 19 Apr. 2010 as U.S. patent application Ser. No. 12/763,171; U.S. Patent Application Publication No. 2011/0083101, entitled "Sharing of Location-Based Content Item in Social-Networking Service" and filed 6 Oct. 2009 as U.S. patent application Ser. No. 12/574,614; U.S. Pat. No. 8,150,844, entitled "Location Ranking Using Social-Graph Information" and filed 18 Aug. 2010 as U.S. patent application Ser. No. 12/858,718; U.S. patent application Ser. No. 13/051,286, entitled "Sending Notifications to Users Based on Users' Notification Tolerance Levels" and filed 18 Mar. 2011; U.S. patent application Ser. No. 13/096,184, entitled "Managing Notifications Pushed to User Devices" and filed 28 Apr. 2011; U.S. patent application Ser. No. 13/276,248, entitled "Platform-Specific Notification Delivery Channel" and filed 18 Oct. 2011; or U.S. Patent Application Publication No. 2012/0197709, entitled "Mobile Advertisement with Social Component for Geo-Social Networking System" and filed 1 Feb. 2011 as U.S. patent application Ser. No. 13/019,061. Although this disclosure describes or illustrates particular advertisements being delivered in particular ways and in connection with particular content, this disclosure contemplates any suitable advertisements delivered in any suitable ways and in connection with any suitable content.

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, e-mails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user e-mails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by social-networking system 160 or shared with other systems (e.g., third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Figure 3:
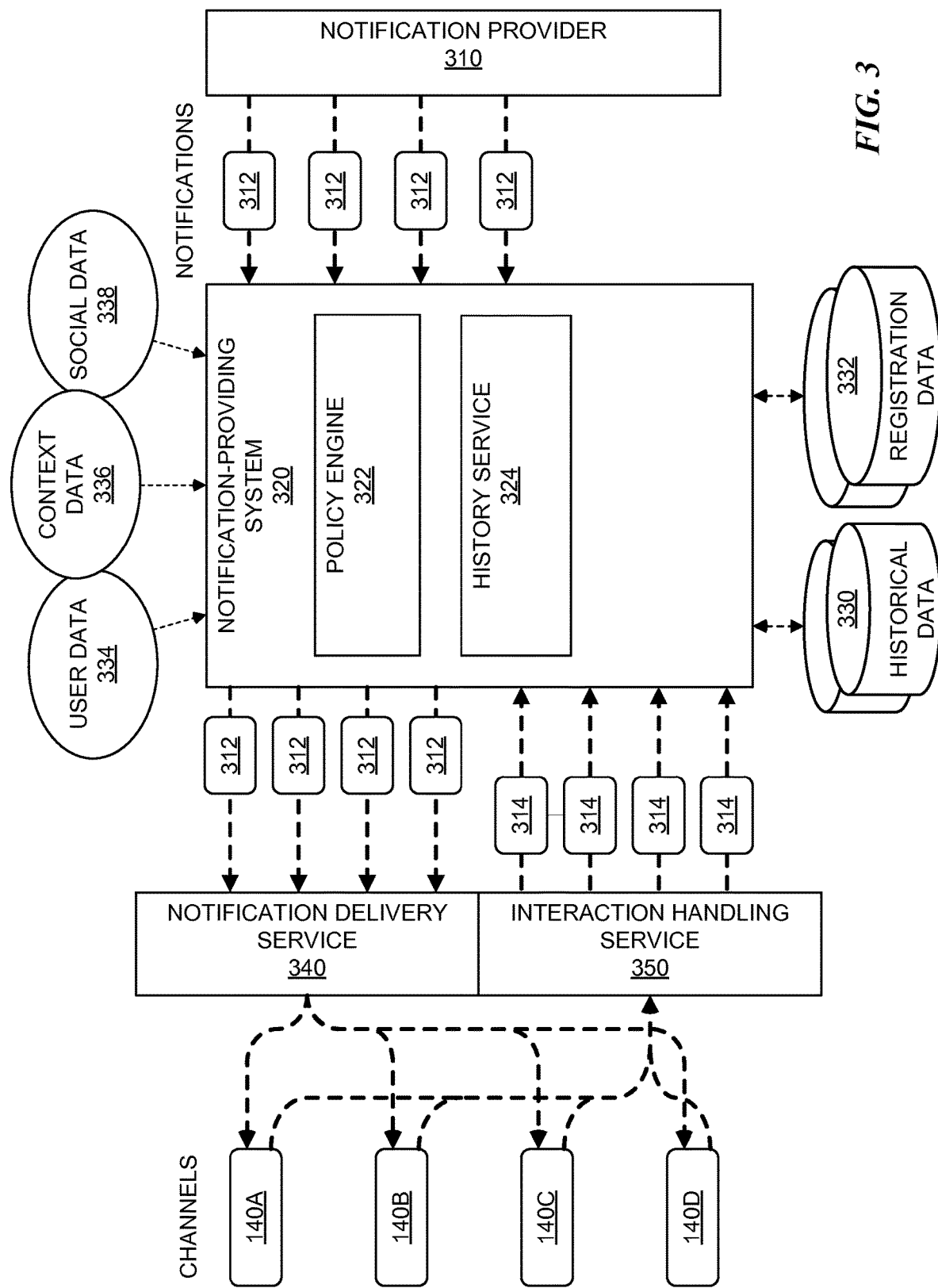
FIG. 3 illustrates an example embodiment of a notification-providing system.

FIG. 3 illustrates an example embodiment of a notification-providing system 320. A notification provider 310 may provide notifications 312 for delivery. In particular embodiments, notifications 312 may include information of activities that are socially relevant to the user. As an example and not by way of limitation, notifications 312 of activities on the social-networking system may include content of posts from friends of the user, friend requests, activities on third-party applications affiliated with the social-networking system, or comments on posts of the user. In particular embodiments, notifications 312 may be pushed to the user based on determining a threshold criteria of notifications 312 being reached. In particular embodiments, notifications 312 may be pushed to the user based on notification-providing system 320 inferring the user may be interested in particular types of notifications 312.

Notification provider 310 may include the social-networking system, a third-party system, or other system providing notification content to be delivered by notification-providing system 320. In the example embodiment illustrated in FIG. 3, notifications 312 may be targeted to the same user, yet delivered differently, due to differences in the current context, the user's social-networking information relating to the content of the notification, the user's past history of interacting with notifications sent by a particular source, etc. In particular embodiments, policy engine 322 of notification-providing system 320 may assess information associated with the notification (e.g., the source, content, type, or format). Such information may be provided within the content of notifications 312 or as associated metadata.

In particular embodiments, the policy engine 322 may also assess information associated with a particular user (e.g., demographic information for the user, the user's location, the user's available delivery channels 140A-D and the status thereof, the user's current delivery context, user profile information, or social-networking information for the user). The policy engine 322 may retrieve information about the user's available delivery channels 140A-D from registration data store 332. Information such as the demographic information for the user, user profile information, or social-networking information for the user may be retrieved as user data 334 and social data 338. Information about the user's current delivery context may be retrieved as context data 336—this category of information may cover any aspect of the user's current delivery context, such as, by way of example and not limitation: information about: a location of the user, a calendar associated with the user, an indicated status of the user, a scheduled event associated with the location, a trajectory of the user, a device status of one or more client devices associated with the user, or the user's current location with respect to other users with whom the user is connected in their social network.

In particular embodiments, policy engine 322 may also retrieve historical notification information about a user's responses to past notifications (e.g., conversion rates or CTR for different notification/context/type/content/delivery patterns) and about prior context/delivery patterns (if any) for the current notification 312 or components (e.g., CTA), as well as interaction levels, rankings, or other suitable scoring, if any, based on those prior context/type/content/delivery patterns from history service 324.

In particular embodiments, policy engine 322 may infer the "quality" of notifications 312 based at least in part on calculating the conversion rate of notifications 312. As an example and not by way of limitation, the conversion rate may be calculated (and notification quality inferred) using counters to track, in real-time, the number of notifications of each type that were sent by notification-delivery service 340 compared with the number of sent notifications 312 that were converted based on user interaction data 314 sent to interaction-handling service 350. Furthermore, the push thresholds of notifications 312 may be adjusted in real-time based on the data of the counters. For example, if the measured CTR for a type of notifications 312 is worse than projected, the push threshold, described below, for that type of notifications 312 may be increased, such that the notification send rate is adjusted to maintain a target conversion rate. As another example, notification-delivery service 340 may reduce the number of notifications 312 to a minimum notification delivery rate that maintains the target conversion rate or may only send notifications 312 that have a conversion rate that is higher than a pre-determined threshold value. In particular embodiments, the conversion rate may be further calculated based on tracking post-login navigation as well as direct CTR or replies to notifications 312.

For a particular delivery channel 140A-D, policy engine 322 may infer a degree of user engagement with particular CTAs that may be included as part of the content of different types of notifications 312. As an example and not by way of limitation, policy engine 322 may determine, based at least in part on data from history service 324, whether a user tends to click on a link of a particular type of notification 312 to get to a website. As another example, policy engine 322 may determine, based on user-interaction data 314, whether the user uses a reply functionality of a particular type of notification 312. In particular embodiments, inferring engagement with a CTA may be based at least in part on delivery channel 140A-D used to deliver the notification. As an example and not by way of limitation, policy engine 322 may determine users may click links in notifications 312 more often when the communication media is e-mail rather than SMS based on user-interaction data 314. In particular embodiments, policy engine 322 may determine user engagement with a particular CTA by attributing a subsequent action (e.g., logging on to the social-networking system) to an action that is correlated to a delivered notification 312.

In particular embodiments, policy engine 322 may classify notifications 312 or delivery channels 140A-D to infer the interest for each user for particular types of notifications ("implicit subscription"). The inferred interest may be used to identify a sub-set of notifications 312 that are not explicitly requested (e.g., comments on the user's posts, posts referencing the user, etc.) and the identified notifications 312 may be in turn sent to the user through an appropriate channel 140A-D. As an example and not by way of limitation, each type of notification 312 may be classified and each type of notification 312 may be assigned an associated subscription level. For example, security-related notifications 312 may be assigned a relatively high subscription level and may always be sent to the user. Notifications 312 with a relatively high subscription level may be sent to the user using a higher-ranked delivery channel 140A-D. In particular embodiments, the inferred interest of each user for a particular type of notification 312 may be determined based at least in part on user history, social-graph information, affinity, etc. As an example and not by way of limitation, policy engine 322 may select notifications 312 for delivery to the user based on information or metadata of notifications 312. For example, policy engine 322 may select a subset of notifications 312 received from notification provider 310 that has content of interest to the user based on a ranking of notifications 312. In particular embodiments, the ranking of notifications 312 received from notification provider 310 may be based at least in part on the type of notifications 312 (e.g., friend post, people you may know (PYMK), trending topic, etc.), one or more features of each type of notifications 312, user interaction history with each type of notifications 312, or any combination thereof. As an example and not by way of limitation, posts may be ranked by number of likes of the post, shares, comments, etc.

In particular embodiments, one or more endpoint options may be configured based on the inferred interest of notifications 312. As an example and not by way of limitation, notifications 312 may be displayed in the system tray of a computing device or lock screen of a mobile device based on the inferred interest of the user. As another example, a notification dimension of an endpoint (e.g., vibration, flashing light, sound, or any combination thereof) may be configured for different types of notifications 312 based on the inferred interest of the user. In particular embodiments, the subscription level of a notification 312 sent on one channel (e.g., 140A) may be affected by the disabling/enabling of another channel (e.g., 140B). Once policy engine 322 has considered the relevant factors and produced a policy to be applied to notifications 312, notification-delivery service 340 may handle formatting and delivering notifications 312 in accordance with the context/delivery pattern specified in the delivery policy.

Notification-delivery service 340 may generate an appropriate form of the notification for delivery through a delivery channel 140A-D, based on the features and capabilities of the underlying medium and endpoint, characteristics of notifications 312, or any combination thereof. In particular embodiments, notification-delivery service 340 may send a digest or summary notification in lieu of batched notifications 312, described below. In particular embodiments, the content of one or more notifications 312 may be modified by notification-delivery service 340 based at least in part on a historical CTR of the type of notification 312, type of notification 312, content of notification 312 (e.g., a CTA), (data) cost of sending notification 312 through one or more delivery channels 140A-C, or any combination thereof. As an example and not by way of limitation, notification-delivery service 340 may modify notification 312 by stripping a portion of the content from notification 312 to increase user engagement. For example, the body and/or subject heading may be stripped from notification 312 as a way to tease the user. As another example, the content of notification 312 may be reduced to a digest or summary of most relevant notifications 312. As another example, the content of notifications 312 may be modified to include one or more CTAs.

In particular embodiments, notification-delivery service 340 may batch notifications 312 in a time-based queue. As an example and not by way of limitation, notifications 312 of a common type (e.g., posts) may be batched in the queue prior to being sent to the user. In particular embodiments, the batched notifications 312 may be sent after a pre-determined amount of time after a notification of the most recent activity was placed in the queue, such that the notifications are sent to the user in a temporally relevant manner. As an example and not by way of limitation, a determination of whether the pre-determined time period has elapsed may be based at least in part on a time stamp associated with notifications 312 or any other suitable metadata of notifications 312. Furthermore, a timer that is tracking the time that has elapsed between notifications 312 of the same type may be reset in response to receiving a new notification 312 in the queue. In particular embodiments, the pre-determined amount of time may be modified based at least in part a predicted CTR for the aggregated notifications 312. As an example and not by way of limitation, the pre-determined amount of time may be reduced based on a predicted CTR being higher than a pre-determined threshold value, thereby inferring the aggregated notifications may be of relatively high interest to the user. In particular embodiments, the delivery policy may exclude particular notifications 312 from time-based batching. As an example and not by way of limitation, notifications 312 from a "verified" profile or close friends may be excluded from the delivery policy associated with time-batched notifications. In this case, the user may get separate notifications 312 from the batched notifications 312.

In particular embodiments, notification-delivery service 340 may schedule notifications 312 for delivery at a specified time and day, for delivery upon detecting a particular user delivery context (e.g., upon detecting that the user has begun actively using their mobile device; upon determining, based on the user's calendar information, that the user should be available; upon determining that the user's location has changed; upon determining that the user has moved within a threshold proximity closer to or farther away from one or more social-networking contacts of the user). In particular embodiments, notification-delivery service 340 may schedule notifications for 312 for delivery based on notifications 312 satisfying one or more threshold criteria. As described above, notification-delivery service 340 may schedule notifications 312 for delivery based at least in part on determining a threshold criteria of notifications 312 (e.g., ranking, subscription level, elapsed time since most recent activity, or CTR threshold) has been satisfied. As an example and not by way of limitation, history service 324 may calculate a predicted CTR (e.g., calculate an interest based on previous engagement or CTR of notifications in queue) for the batched notifications 312 in the queue of notification delivery service 340 and schedule delivery of the batched notifications 312 in response to the predicted CTR being higher than a pre-determined threshold value.

After having delivered the notifications to delivery channels 140, user-interaction data 314 may be sent back to an interaction-handling service 350, which sends the user-interaction data 314 on to history service 324. History service 324 of the notification-providing system 340 may collect and analyze the user's responses to past notifications in order to determine the user's level of interaction (if any) with the past notifications 312. Information about the user's responses to past notifications may be stored in a historical notification data store 330. As an example and not by way of limitation, the history service 324 may estimate the CTR for a particular type of notification. As another example, history service 324 may calculate push thresholds for each user that determine whether or when a particular type of notifications 312 is sent. For example, the push thresholds may be determined based on predicting conversion rates (e.g., CTR) from user history with the particular type of notifications 312. Push thresholds may be calculated at pre-determined periods of time (e.g., every day) based on the previous week's conversion rates for each type of notifications 312. In addition, push thresholds may be inferred based on negative signals of notifications 312 (e.g., zero CTR or never clicking, unsubscribe (by type, by content item, an indication of "don't like", or context/group-related), disabling push notifications 312, logout from an application, or any combination thereof), as described above.

Figure 4:
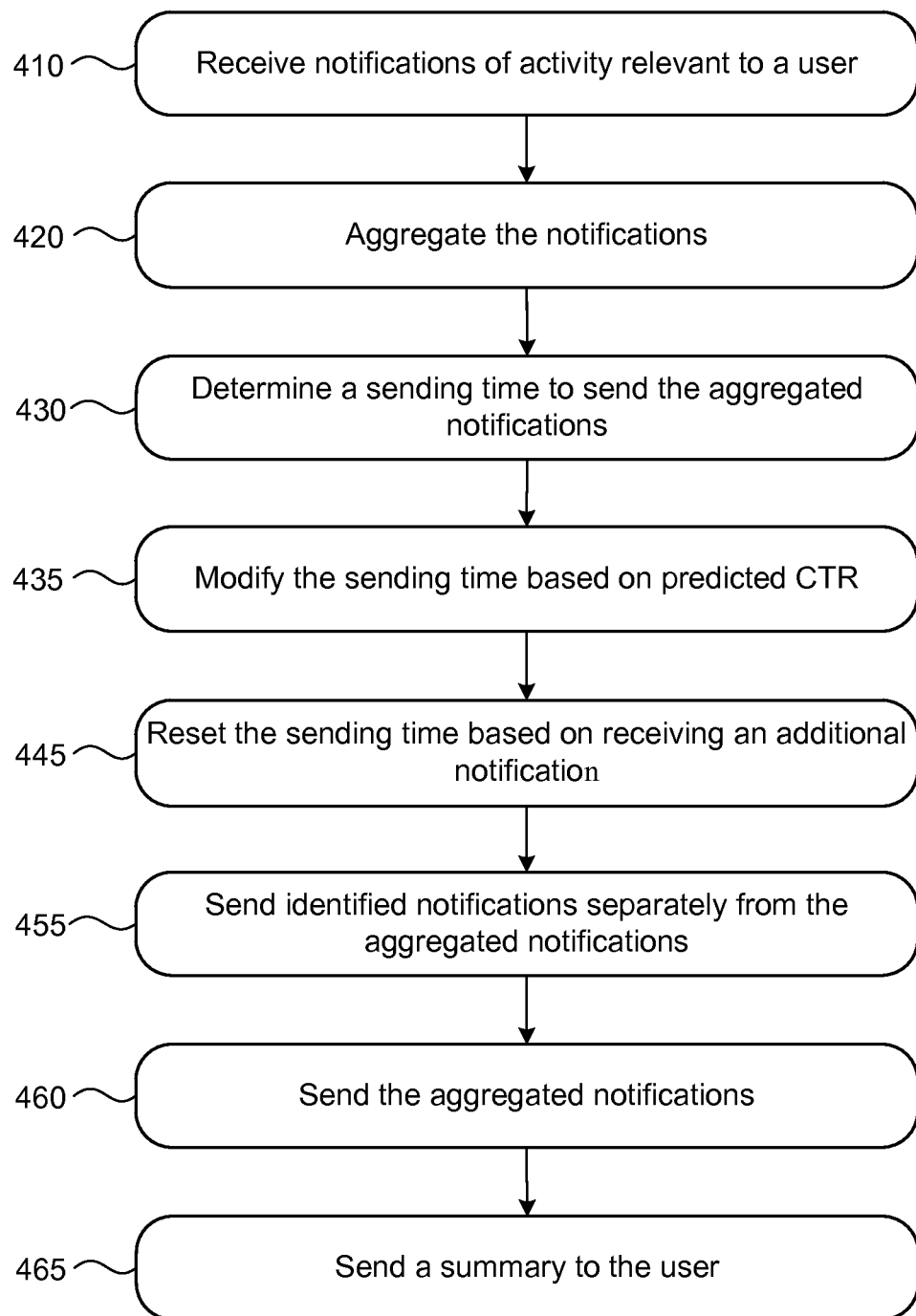
FIG. 4 illustrates an example method for time-based notification delivery.

FIG. 4 illustrates an example method 400 for time-based notification delivery. In step 410, the notification-providing system receives a number of notifications of activity relevant to the user delivery. As an example and not by way of limitation, a number of the received notifications may be comments related to a photo shared by Eliza. In particular embodiments, each notification has an associated receipt time and type. As an example and not by way of limitation, the receipt time may be stored as a time stamp associated with the notifications or any other suitable metadata of the notifications.

In step 420, the notification-providing system may aggregate one or more of the notifications based on the type of notification. In particular embodiments, the notification-providing system may include a queue to batch notifications of the same type. As an example and not by way of limitation, notifications of comments to Eliza's photo made by people connected to Eliza (e.g., friends) may be batched together in the queue.

In step 430, the notification-providing system determines a sending time to send the aggregated notifications based at least in part on determining that a pre-determined amount of time that has elapsed from the receipt time of the most recent notification in the queue. In particular embodiments, the pre-determined amount of time is based at least in part on the type of notification. As an example and not by way of limitation, a delivery policy for posts may have a pre-determined amount of time of fifteen minutes, while the delivery policy for trending topics may have a pre-determined amount of time of an hour. Furthermore, a batch of three notifications of activity related to Eliza's photo (e.g., likes or comments) may be in the queue and the policy engine may determine the pre-determined time period for comments on Eliza's photo is approximately fifteen minutes. In step 435, the notification-providing system may determine a predicted CTR for the aggregated notifications and modify the sending time (e.g., modifying the pre-determined amount of time) based on the predicted CTR being higher than a pre-determined threshold value.

In step 445, the notification-providing system may receive an additional notification having a same type as the aggregated notifications in the queue. The notification-providing system may add the additional notification to the aggregated notifications in the queue and reset the sending time based at least in part on a receipt time of the additional notification (e.g., tracking the elapsed time from the receipt time of the additional notification). As an example and not by way of limitation, the notification-providing system may receive a notification of new comment related to Eliza's post made by one of Eliza's friends within fifteen minutes of the most recent notification in the queue. The notification-providing system aggregate the new notification with the other notifications already in the queue and the timer that is tracking the elapsed time may be reset for another fifteen minutes.

In step 455, the notification-providing system may identify one or more notifications from the aggregated notifications. The notifications may be identified based on an affinity between the user and another user associated with the notification. The policy engine may schedule the identified notifications to be sent the user separately from the aggregated notifications. As an example and not by way of limitation, the policy engine may determine the affinity between Eliza and one of her friends, Betty. If the affinity between Eliza and her friend is above a pre-determined threshold, the policy engine may identify a comment on Eliza's posted photo from Betty in the notification queue that is batched with other comments to Eliza's posted photo and separately send the comment from Betty. In addition, the delivery channel used to deliver the notification of Betty's comment may be determined based on the affinity or Eliza's user history.

In step 460, the notification-providing system may send the aggregated notifications to the user based on the sending time. As an example and not by way of limitation, if there is no new activity related to Eliza's posted photo within fifteen minutes of the most recent notification, the batch of notifications is sent to Eliza through the appropriate delivery channels 140A-C in accordance with the delivery policy, described above. By retrieving information about Eliza's current delivery context, the policy engine may determine that based on historical use data, Eliza always checks her mobile device immediately. Thus, the notification-providing system may determine that she is much more likely to check her mobile device and send the batched notifications to her mobile device. In step 465, the notification-providing system may generate a summary of the aggregated notifications and send the notification summary to the user based on the sending time, described above, in place of the batched notifications.

Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for time-based notification delivery including the particular steps of the method of FIG. 4, this disclosure contemplates any suitable method for time-based notification delivery including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
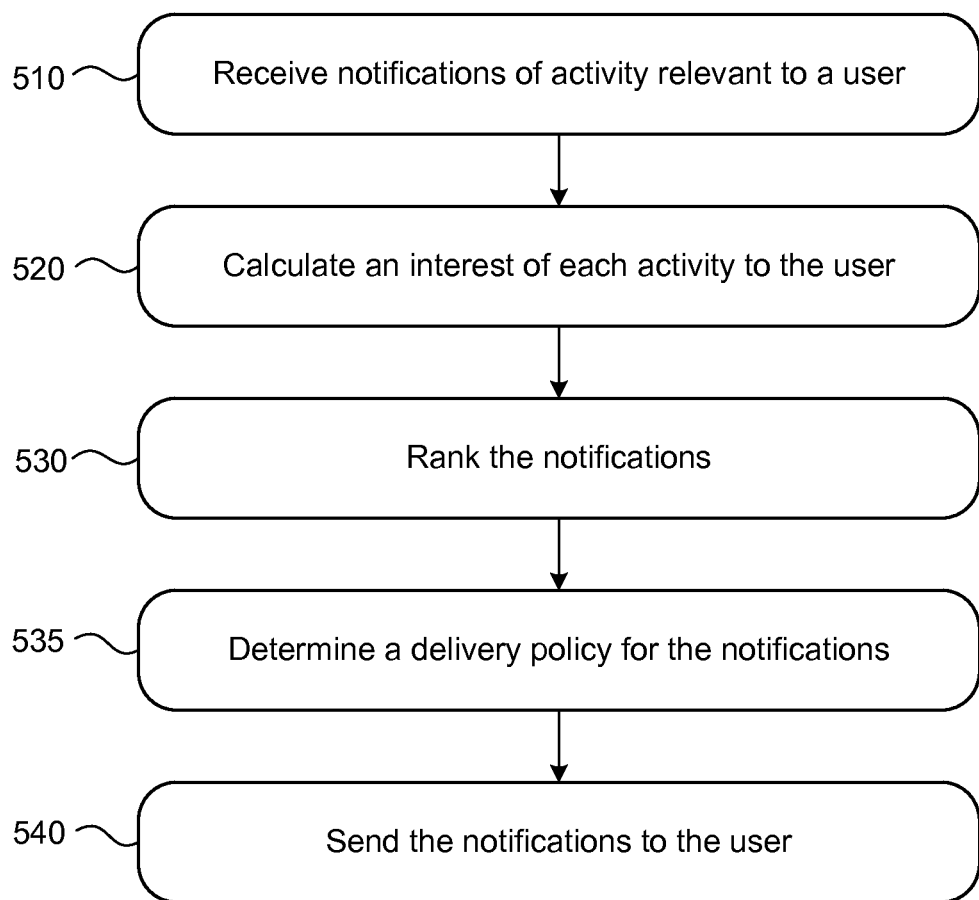
FIG. 5 illustrates an example method for notification delivery based on a calculated interest of the user.

FIG. 5 illustrates an example method 500 for notification delivery based on a calculated interest of the user. In step 510, the notification-providing system receives a number of notifications of activity relevant to the user. In particular embodiments, each of the received notifications has an associated type. Example types of notifications of activity relevant to the user may include posts, PYMKs, trending topics, or advertisements.

In step 520, the policy engine of the notification-providing system may calculate the interest the user has for each activity based at least in part on the type of each received notification. As an example and not by way of limitation, the calculated interest may be based on a user history, affinity between the user and the originator of the activity, features of each type of notification, delivery pattern of the user associated with each type of notification, or any combination thereof. The user history may include the CTR of previous notifications of the same type as the received notifications. For example, the notification-providing system may track Eliza's CTR for notifications related to posts and her CTR for notifications related to PYMK and infer that Eliza is more interested in post-based notifications compared to PYMK-based notifications. The notification-providing system may analyze the previous delivery pattern for the type of notification and calculate the interest based on the time that the notifications were sent. For example, the policy engine may determine that Eliza typically responds to messages sent within an average of two minutes regardless of when the messages are sent to her based at least in part on her user-interaction data. In addition, the policy engine may determine that she typically responds to post sent after midnight within an average of 5 minutes. Thus, the policy engine may calculate Eliza has a high level of interest for posts sent late at night. In particular embodiments, the calculated interest may be based on an affinity between the user and the originator of the activity. For example, the policy engine may determine the affinity between Eliza and one of her friends, Luke. If the affinity between Eliza and Luke is relatively high, the policy engine may calculate that Eliza has a relatively high interest in notifications related to Luke. As another example, the calculated interest for PYMK may be based on a PYMK score. In particular embodiments, the PYMK score may be based on a degree of commonality or affinity between the suggested friends and Eliza. As another example, the calculated interest may be calculated based on features of the received notifications, such as a number of likes, comments, or re-shares associated with the notifications. The features may be weighted by the affinity of the users generating the features. For example, a like to a post by Luke may be weighed more heavily than a like by a user unconnected to Eliza.

In step 530, the notification-providing system ranks the received notifications based at least in part on the calculated interest. As an example and not by way of limitation, the policy engine may rank Eliza's notifications of multiple types based on the calculated interest, as described above. For example, the notifications for Eliza in the queue of the notification-providing system may include a comment from her friend Luke, a PYMK with a low PYMK score, and a post with thirty re-shares. Based on Eliza's user history with each type of notification, the policy engine may rank these notifications in an order of the comment, the post, and the PYMK (listed from highest interest to lowest).

In step 535, the notification-providing system determines a delivery policy, which is applied to the notifications. In particular embodiments, certain notification types (e.g., comments) may be sent to certain delivery channels (e.g., newsfeed page) but never to certain other delivery channels (e.g., SMS to her mobile phone). Given the nature of the communication, the delivery policy may indicate that an SMS message should be re-sent to her mobile device once every five minutes until she interacts with the notification or dismisses it.

In step 540, the notification-providing system sends one or more of the notifications to the user in accordance to the delivery policy determined in step 535. As an example and not by way of limitation, the notification-providing system may send the notifications with a ranking higher than a pre-determined threshold ranking. For example, the notification-providing system may have a pre-determined threshold ranking for Eliza of two, such that at a given time period the top two ranked notifications are sent to Eliza. For Eliza, the notifications sent to Eliza would be the comment from Luke and the post with the thirty re-shares.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for notification delivery based on a calculated interest of the user including the particular steps of the method of FIG. 5, this disclosure contemplates any suitable method for notification delivery based on a calculated interest of the user including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5. Furthermore, although this disclosure describes and illustrates delivery of notification-type communications, this disclosure contemplates any suitable type of communication.

Figure 6:
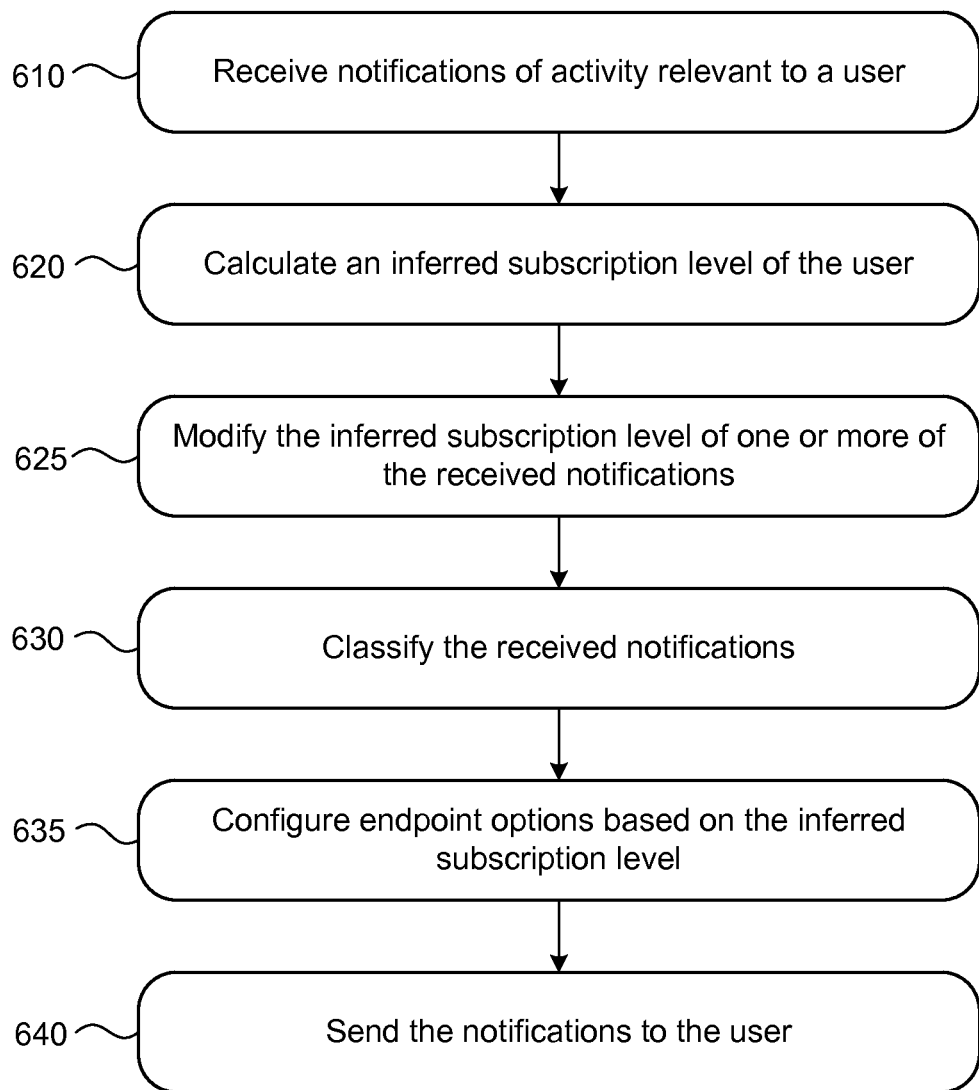
FIG. 6 illustrates an example method for notification delivery based on an inferred interest level of the user.

FIG. 6 illustrates an example method 600 for notification delivery based on an inferred interest level of the user. In step 610, the notification-providing system receives a number of notifications of activity relevant to the user. In particular embodiments, each of the received notifications has an associated type. Example types of notifications of activity relevant to the user may include posts, PYMKs, trending topics, or advertisements.

In step 620, the policy engine of the notification-providing system may calculate an inferred subscription level of the user based at least in part on the type of each received notification. As an example and not by way of limitation, the inferred subscription level may be based on a user history, affinity between the user and the originator of the activity, features of each type of notification, delivery pattern of the user associated with each type of notification, content of the notifications, or any combination thereof. The user history may include the CTR of previous notifications of the same type as the received notifications. For example, the policy engine may calculate that Eliza has a relatively high CTR associated with notifications that refer to her. As another example, the policy engine may calculate the inferred subscription level of security-related notifications is relatively high for all users. In step 625, the policy engine may modify the inferred subscription level of one or more of the received notifications based on one or more of the identified communication media being enabled or disabled, which is applied to one or more of the notifications in step 620. For example, the policy engine may decrease the inferred subscription level of post-based notifications sent by e-mail after Eliza has removed her e-mail as a delivery channel on the social-networking system.

In step 630, the notification-providing system classifies the received notifications based at least in part on the inferred subscription level. As an example and not by way of limitation, the policy engine may identify a subset of the received notifications that the user has not explicitly subscribed to. For example, the policy engine may identify notifications that refer to Eliza on her newsfeed as having a relatively high inferred subscription level, even though Eliza has not explicitly requested these notifications. In step 635, the notification-providing system may configure one or more endpoint options based on the inferred subscription level. As an example and not by way of limitation, the policy engine may configure a trending topic notification to be displayed in a system tray of a desktop computer. As another example, the policy engine may configure Eliza's mobile phone to vibrate when receiving a notification that refers to her.

In step 640, the notification-providing system sends one or more of the notifications to the user. As an example and not by way of limitation, the notification-providing system may send the notifications with an inferred subscription level that is higher than a pre-determined threshold subscription level. In particular embodiments, the notifications with an inferred subscription level higher than the pre-determined threshold subscription level may be sent without explicit input by the user.

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for notification delivery based on an inferred subscription level for the user including the particular steps of the method of FIG. 6, this disclosure contemplates any suitable method for notification delivery based on an inferred subscription level for the user including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6. Furthermore, although this disclosure describes and illustrates delivery of notification-type communications, this disclosure contemplates any suitable type of communication.

Figure 7:
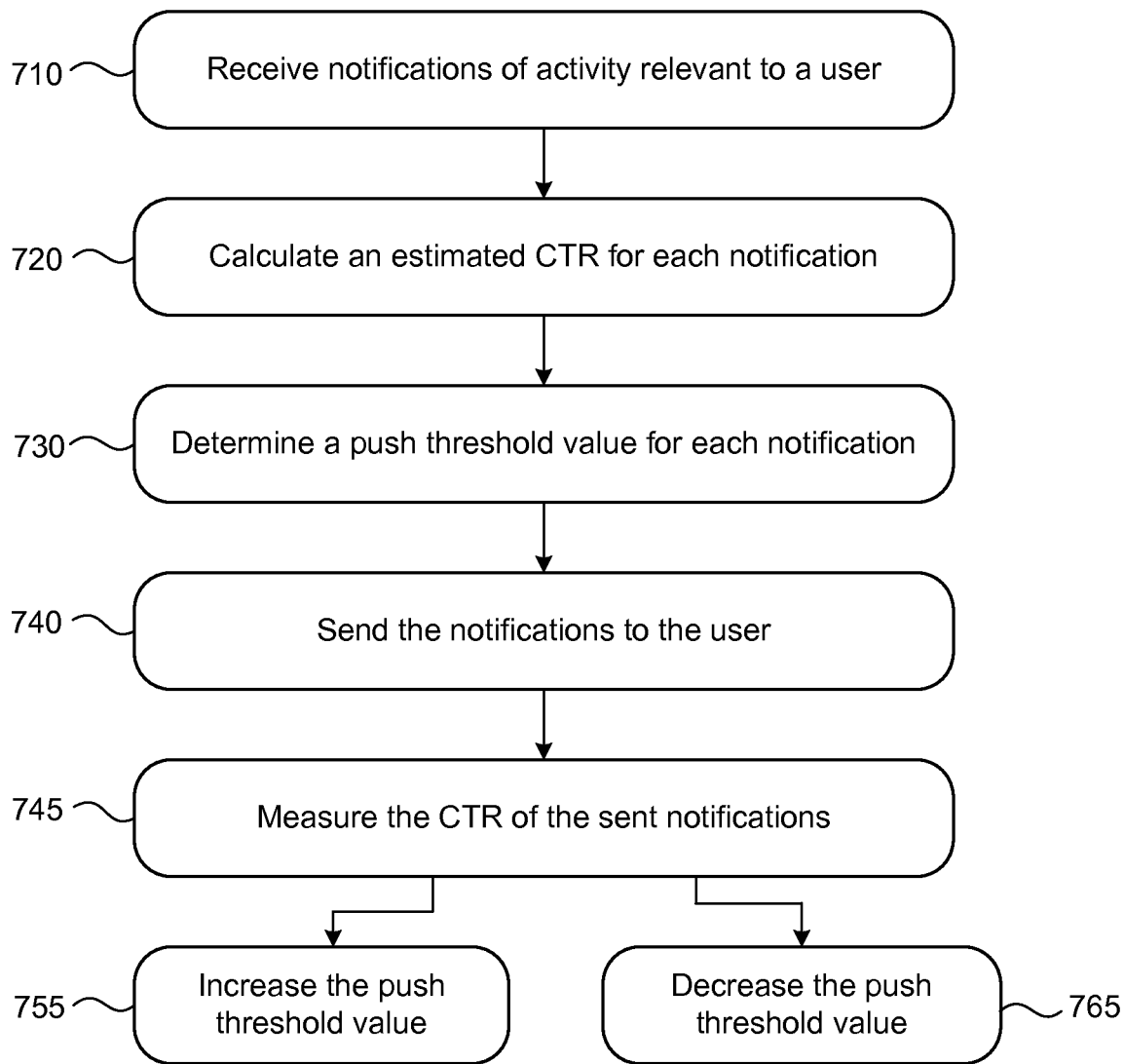
FIG. 7 illustrates an example method for notification delivery based on a push threshold.

FIG. 7 illustrates an example method 700 for notification delivery based on a push threshold. In step 710, the notification-providing system receives a number of notifications of activity relevant to the user. In particular embodiments, each of the received notifications has an associated type. Example types of notifications of activity relevant to the user may include posts, PYMKs, trending topics, or advertisements.

In step 720, the policy engine of the notification-providing system may calculate an estimated CTR for each notification based at least in part on the type associated with each notification. As an example and not by way of limitation, the estimated CTR of a notification may be based on a user history, one or more negative signals, delivery pattern of the user associated with each type of notification, or any combination thereof. The user history may include the CTR of previous notifications of the same type as the received notifications. For example, the notification-providing system may track Eliza's CTR for notifications related to re-shares and her CTR for notifications related to trending topics and infer that Eliza is more interested in re-share notifications as compared to trending-topics notifications.

The notification-providing system may analyze "negative" signals indicating disinterest in particular types of notifications. For example, the policy engine may take into account activity of a user, such as a low CTR with notifications of a particular type, an input to unsubscribe from a particular type of notification, an input disabling a type of push notification, an indication the user has logged off an application, or any combination thereof. As an example and not by way of limitation, the policy engine may calculate that re-share notifications have a low CTR for Eliza based on Eliza's historical notification information, as described above. As another example, the policy engine may calculate a relatively low estimated CTR based on Eliza has unsubscribing to PYMK notifications. In particular embodiments, each negative signal may have a different effect on the estimated CTR. As an example and not by way of limitation, unsubscribing from a type of notification may have less of an effect on the estimated CTR than disabling push notifications.

In step 730, the policy engine may determine a push threshold value for each notification based at least in part on the estimated CTR for each notification. In particular embodiments, the push threshold may vary based at least in part on the type of notification. As an example and not by way of limitation, Eliza may have a push threshold value for PYMK notifications and a separate push threshold value for re-share notifications. In step 740, the notification-providing system sends one or more of the notifications to the user. As an example and not by way of limitation, the notification-providing system may send the notifications with push threshold values that is higher than a pre-determined threshold value As described above, the notification-providing system may include counters to track the number of notifications of each type that are sent to the user. In step 745, the policy engine may measure the CTR of the sent notifications based at least in part on comparing a number of conversions with the number of sent notifications. In step 755, the policy engine may increase the push threshold value for notifications of the particular type in response to the measured CTR, as calculated in step 745, being lower than the estimated CTR that was calculated in step 720. In step 765, the policy engine may decrease the push threshold value for notifications of the particular type in response to the measured CTR, as calculated in step 745, being higher than the estimated CTR that was calculated in step 720.

Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for notification delivery based on a push threshold including the particular steps of the method of FIG. 7, this disclosure contemplates any suitable method for notification delivery based on a push threshold including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7. Furthermore, although this disclosure describes and illustrates delivery of notification-type communications, this disclosure contemplates any suitable type of communication.

Figure 8:
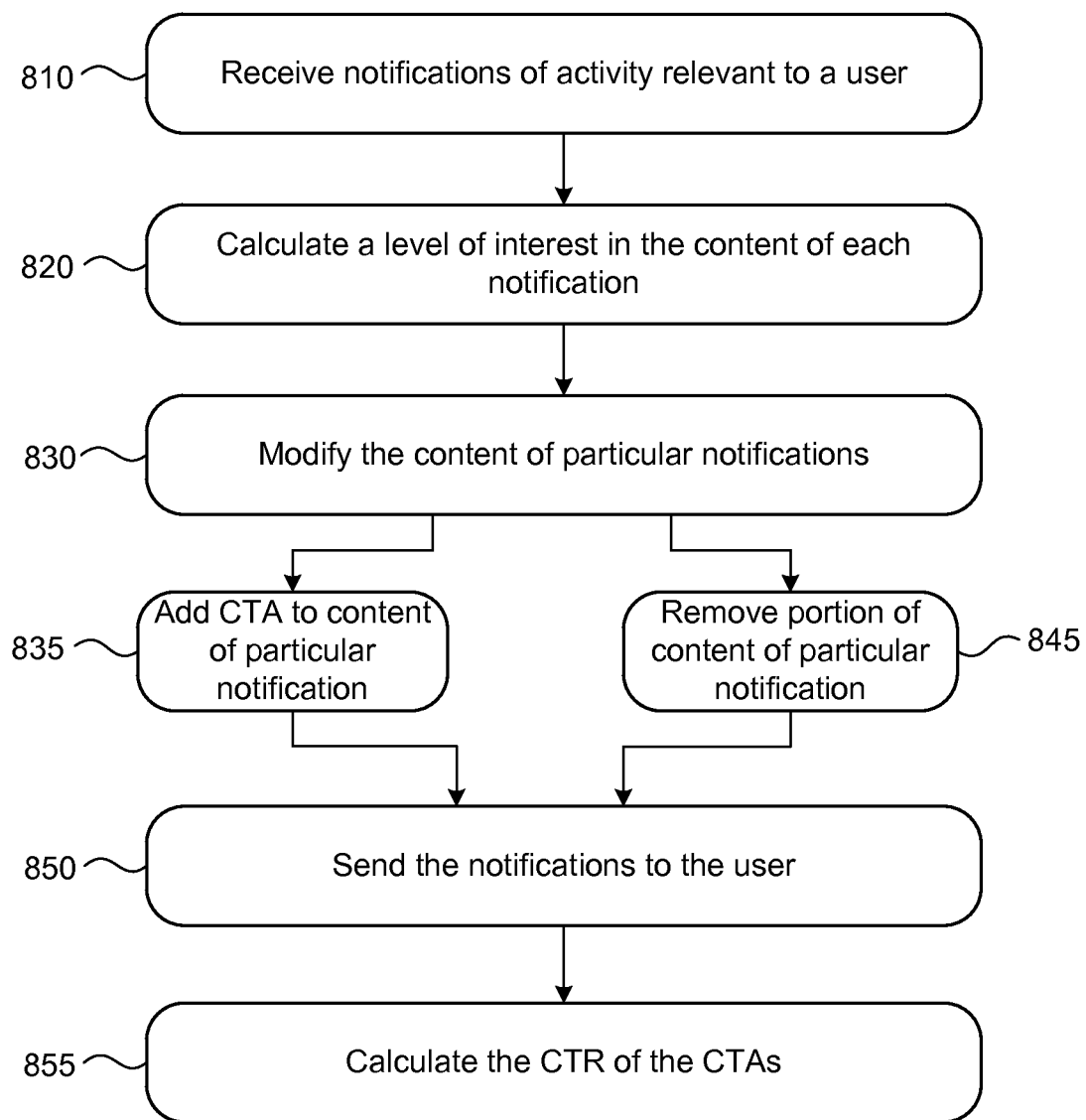
FIG. 8 illustrates an example method for modifying content of notifications.

FIG. 8 illustrates an example method 800 for modifying content of notifications. In step 810, the notification-providing system receives a number of notifications of activity relevant to the user. In particular embodiments, each of the received notifications has an associated type. Example types of notifications of activity relevant to the user may include posts, PYMKs, trending topics, or advertisements.

In step 820, the policy engine of the notification-providing system may calculate a level of interest in the content of each notification based at least in part on the type associated with each notification. In particular embodiments, the calculated level of interest in the content of notification may be based on a user history. As an example and not by way of limitation, the user history may include the CTR of previous notifications of the same type as the received notifications, CTR with particular content of the notification, the delivery pattern of the user associated with each type of notification, or any combination thereof. For example, the notification-providing system may track Eliza's CTR for notifications related to posts and her CTR for a CTA, such as a "reply" CTA, that are part of the content related to posts and infer that Eliza has a relatively high interest in interacting with the "reply" CTA of post notifications based on Eliza's previous user history. In particular embodiments, the policy engine may determine the cost sending a particular notification based on the delivery policy associated with the particular type of notification.

In step 830, the policy engine may modify the content of particular notifications based at least in part on the calculated level of interest. In step 835, the policy engine may add a CTA to the content of a particular notification. As an example and not by way of limitation, the content of a post notification for Eliza may be modified to include a "reply" CTA based on her previous user history of using that functionality. In step 845, the policy engine may remove a portion the content of a particular notification. As an example and not by way of limitation, the content of a post notification for Eliza may be modified to remove an image from the content of post notification based on a relatively high data cost of sending the post notification to Eliza through SMS in accordance with her delivery policy.

In step 850, the notification-providing system sends one or more of the notifications with modified content to the user. In step 855, the policy engine may determine the number of modified notifications with a CTA that were sent and calculate the CTR of the CTAs by comparing the number of conversions to the number of sent notifications with modified content.

Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for modifying content of notifications including the particular steps of the method of FIG. 8, this disclosure contemplates any suitable method for modifying content of notifications including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8. Furthermore, although this disclosure describes and illustrates delivery of notification-type communications, this disclosure contemplates any suitable type of communication.

Figure 9:
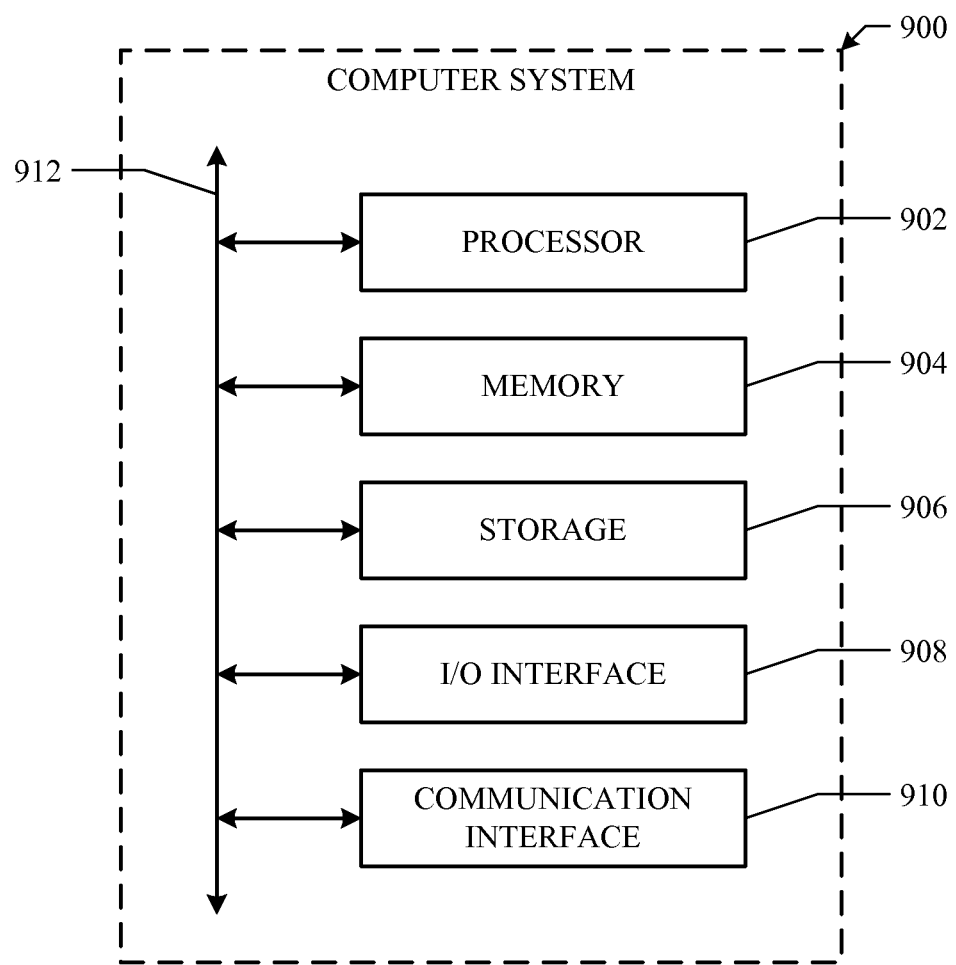
FIG. 9 illustrates an example computer system.

FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   by a computing device, receiving a plurality of notifications to send to a first user, the notifications indicating activities of a plurality of second users on a social-networking system, wherein each notification has an associated receipt time and type of notification;
   by the computing device, aggregating notifications of a common type, wherein the aggregated notifications indicate activities of the plurality of second users on the social-networking system relating to the common type;
   by the computing device, determining a first pre-determined amount of sending time associated with a first type of the aggregated notifications, wherein the first pre-determined amount of sending time associated with the first type of the aggregated notifications is different from a second pre-determined amount of sending time associated with a second type of aggregated notifications;
   accessing a delivery pattern of the first user;
   modifying the first pre-determined amount of sending time based on the delivery pattern;
   by the computing device, calculating a click-through rate (CTR) for the first type of the aggregated notifications, wherein the CTR is calculated based on past user interactions with notifications that are of the common type as the first type of the aggregated notifications;
   by the computing device, reducing the first modified pre-determined amount of sending time associated with the first type of the aggregated notifications based on calculated CTR being higher than a pre-determined threshold value;
   by the computing device, determining that reduced first pre-determined amount of sending time associated with the first type of the aggregated notifications has elapsed from a receipt time of a last added notification in the first type of the aggregated notifications; and
   by the computing device, sending the first type of the aggregated notifications to the first user in response to determining the reduced first pre-determined amount of sending time being elapsed from the receipt time of the last added notification in the first type of the aggregated notifications.

2. The method of claim 1, wherein the first pre-determined amount of sending time is based at least in part on the first type of the aggregated notifications.

3. The method of claim 1, further comprising:
   receiving an additional notification having a same type as the first type of the aggregated notifications;
   adding the additional notification to the first type of the aggregated notifications; and
   resetting the first pre-determined amount of sending time based at least in part on a receipt time of the additional notification.

4. The method of claim 1, wherein the sending the first type of the aggregated notifications comprises sending the first type of the aggregated notifications in accordance to a delivery policy, wherein the delivery policy comprises:
   whether to send the first type of the aggregated notifications to the first user;
   identification of an endpoint associated with the first user to send the first type of the aggregated notifications; or
   identification of a communication media to send the first type of the aggregated notifications to the first user.

5. The method of claim 4, wherein the sending the first type of the aggregated notifications is further based on the identified endpoint.

6. The method of claim 4, wherein the sending the first type of the aggregated notifications is further based on the identified communication media.

7. The method of claim 4, wherein the communication endpoints comprise a particular client device, e-mail address, or phone number of the first user.

8. The method of claim 4, wherein the communication media comprise a short-messaging service (SMS) message, multimedia-messaging service (MMS) message, incoming call notification, or e-mail message.

9. The method of claim 1, wherein the first type of the aggregated notifications are sent in accordance with privacy settings of the first user.

10. The method of claim 1, further comprising:
generating a summary of the first type of the aggregated notifications; and
sending the summary to the first user based on the reduced first pre-determined amount of sending time.

11. The method of claim 1, wherein the first user is represented by a first user node in a social graph associated with the social-networking system, and wherein the plurality of second users are represented by second user nodes, further comprising:
identifying one or more notifications from the first type of the aggregated notifications based on an affinity between the first and second user nodes; and
sending the identified notifications to the first user separately from the first type of the aggregated notifications.

12. The method of claim 1, wherein the first type of the aggregated notifications comprise a plurality of individual notifications sent by the computing device at substantially a same time.

13. The method of claim 1, further comprising storing the first type of the aggregated notifications in a queue.

14. The method of claim 1, wherein the types of notifications comprise posts, people you may know, trending topic, or advertisement.

15. The method of claim 1, wherein one or more of the received notifications are associated with a third-party system.

16. The method of claim 1, wherein one or more of the received notifications are associated with an application of a third-party system.

17. One or more computer-readable non-transitory storage media embodying software configured when executed to:
receive a plurality of notifications to send to a first user, the notifications indicating activities of a plurality of second users on a social-networking system, wherein each notification has an associated receipt time and type of notification;
aggregate notifications of a common type, wherein the aggregated notifications indicate activities of the plurality of second users on the social-networking system relating to the common type;
determine a first pre-determined amount of sending time associated with a first type of the aggregated notifications, wherein the first pre-determined amount of sending time associated with the first type of the aggregated notifications is different from a second pre-determined amount of sending time associated with a second type of aggregated notifications;
access a delivery pattern of the first user;
modify the first pre-determined amount of sending time based on the delivery pattern;
calculate a click-through rate (CTR) for the first type of the aggregated notifications, wherein the CTR is calculated based on past user interactions with notifications that are of the common type as the first type of the aggregated notifications;
reduce the first modified pre-determined amount of sending time associated with the first type of the aggregated notifications based on calculated CTR being higher than a pre-determined threshold value;
determine that reduced first pre-determined amount of sending time associated with the first type of the aggregated notifications has elapsed from a receipt time of a last added notification in the first type of the aggregated notifications; and
send the first of the aggregated notifications to the first user in response to determining the reduced first pre-determined amount of sending time being elapsed from the receipt time of the last added notification in the first type of the aggregated notifications.

18. A device comprising:
one or more processors; and
one or more computer-readable non-transitory storage media coupled to the processors and embodying software configured when executed to:
receive a plurality of notifications to send to a first user, the notifications indicating activities of a plurality of second users on a social-networking system, wherein each notification has an associated receipt time and type of notification;
aggregate notifications of a common type, wherein the aggregated notifications indicate activities of the plurality of second users on the social-networking system relating to the common type;
determine a first pre-determined amount of sending time associated with a first type of the aggregated notifications, wherein the first pre-determined amount of sending time associated with the first type of the aggregated notifications is different from a second pre-determined amount of sending time associated with a second type of aggregated notifications;
access a delivery pattern of the first user;
modify the first pre-determined amount of sending time based on the delivery pattern;
calculate a click-through rate (CTR) for the first type of the aggregated notifications, wherein the CTR is calculated based on past user interactions with notifications that are of the common type as the first type of the aggregated notifications;
reduce the first modified pre-determined amount of sending time associated with the first type of the aggregated notifications based on calculated CTR being higher than a pre-determined threshold value;
determine that reduced first pre-determined amount of sending time associated with the first type of the aggregated notifications has elapsed from a receipt time of a last added notification in the first type of the aggregated notifications; and
send the first type of the aggregated notifications to the first user in response to determining the reduced first pre-determined amount of sending time being elapsed from the receipt time of the last added notification in the first type of the aggregated notifications.

* * * * *